Patented Dec. 5, 1944

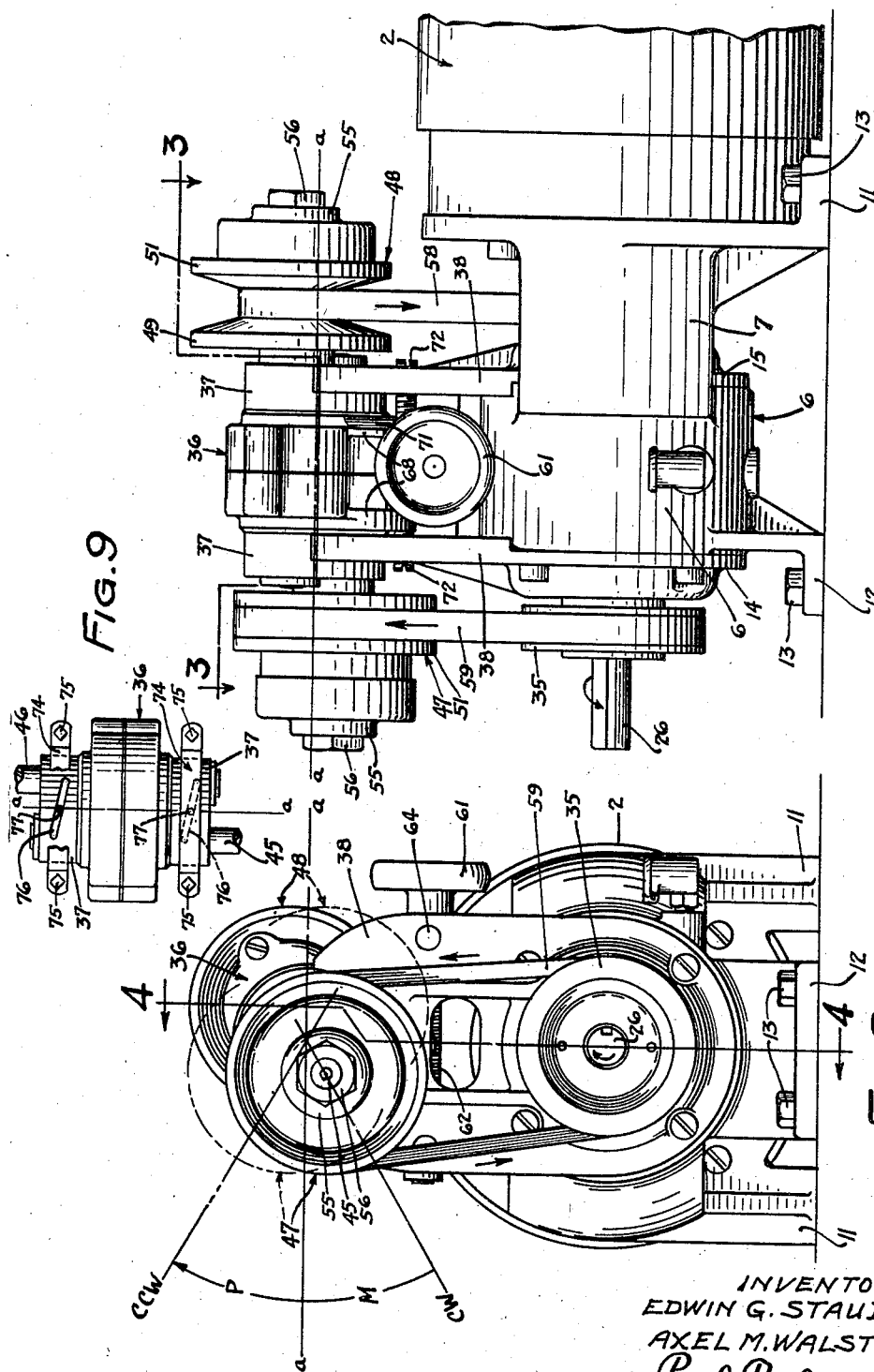

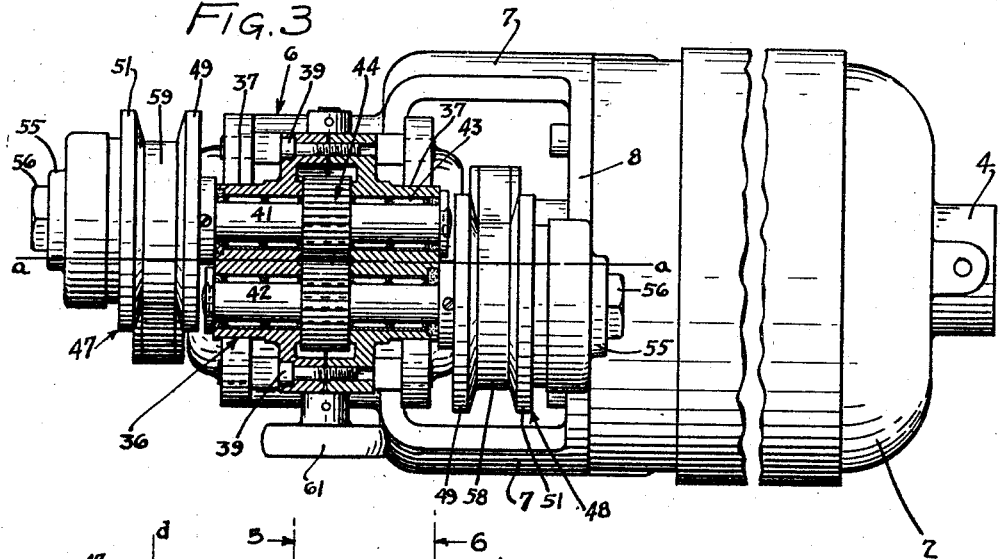
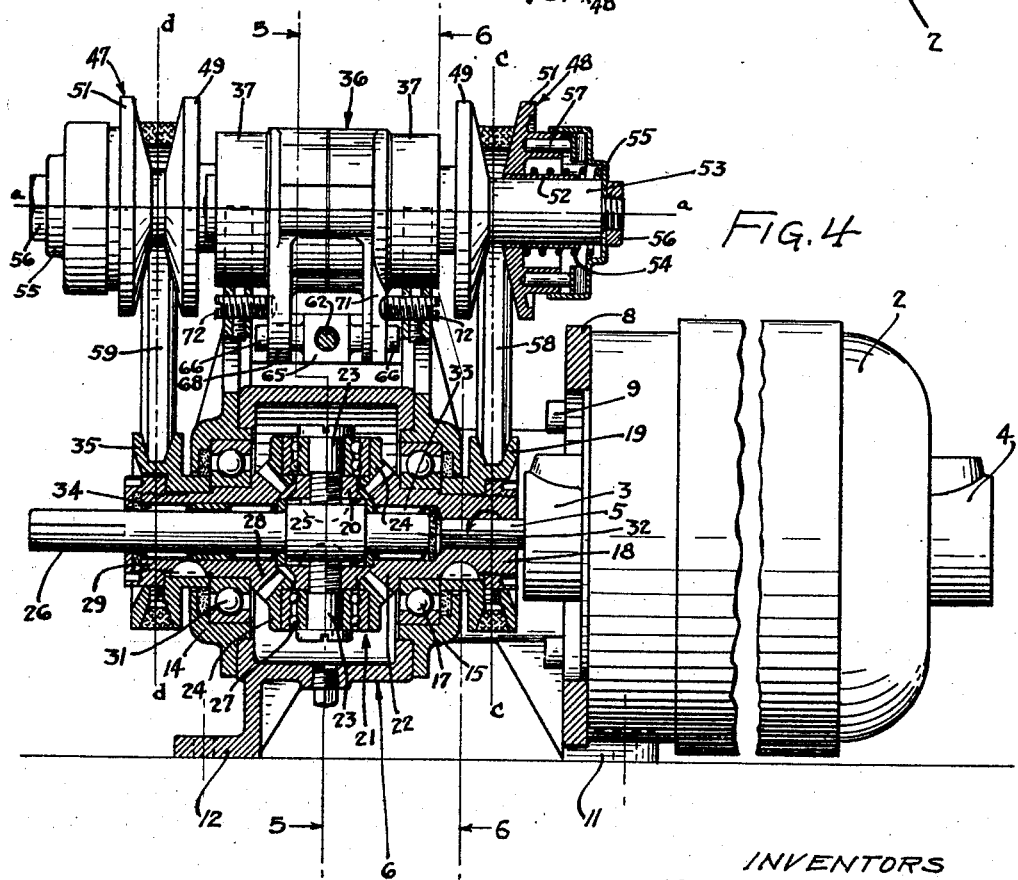

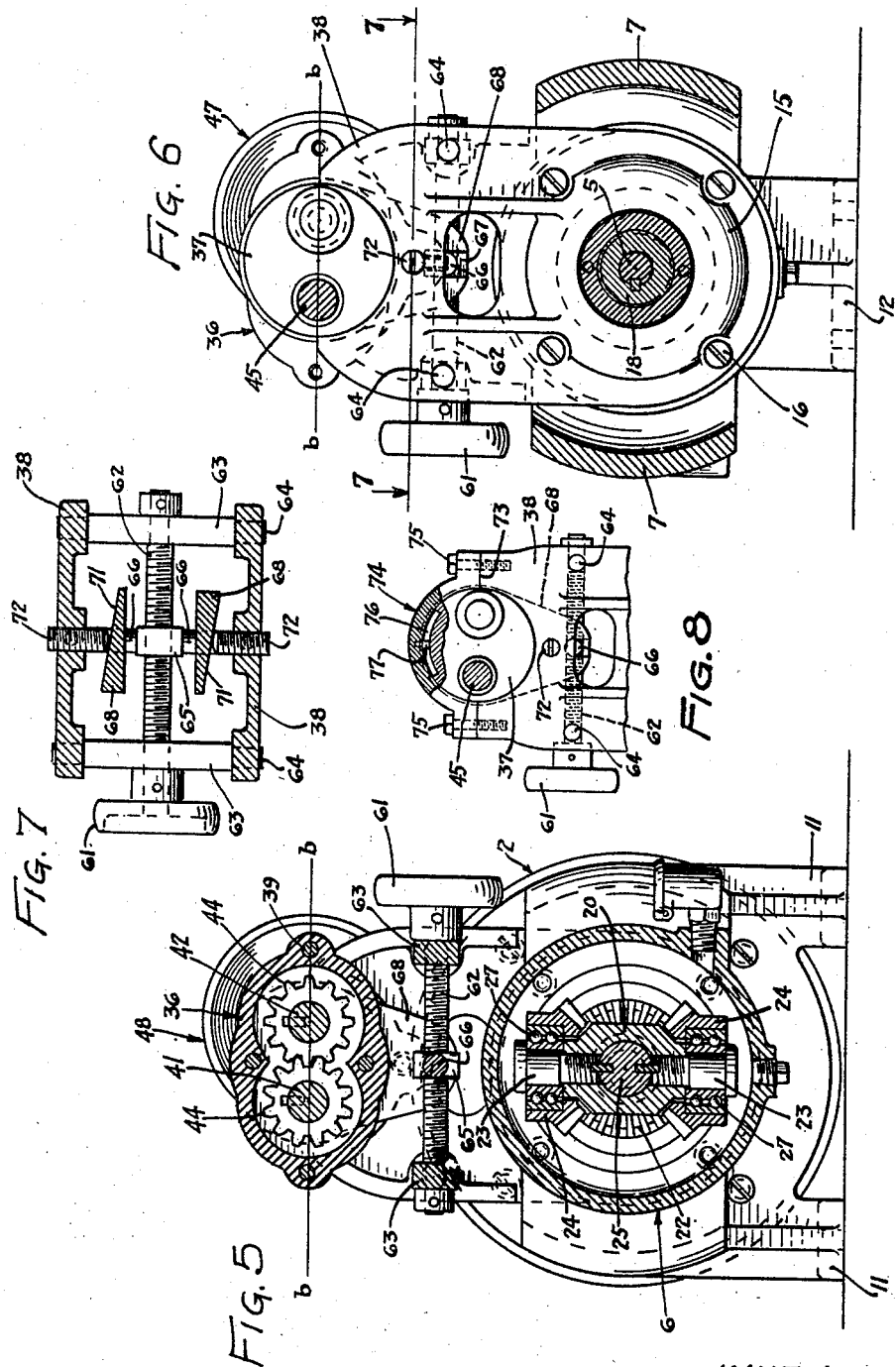

2,364,325

UNITED STATES PATENT OFFICE 2,364,325

VARIABLE SPEED TRANSMISSION

Edwin G. Staude and Axel M. Walstrom, Minneapolis, Minn.; said Walstrom assignor to said Staude Application December 30, 1942, Serial No. 470,568

3 Claims. (Cl. 74—286)

This invention relates to new and useful improvements in variable speed transmissions of the general character disclosed in our co-pending application Ser. No. 448,392, filed June 25, 1942.

An object of the present invention is to provide a variable speed transmission of the character disclosed which has a wide range of speeds in both forward and reverse, and which is so constructed as to minimize belt friction to the utmost, thereby increasing the efficiency of the apparatus.

A further object is to provide a variable speed transmission of the type disclosed which is very compact and efficient in operation, whereby it readily lends itself for use in connection with various types of apparatuses which require a variable speed power transmitting means.

A further object is to provide a variable speed transmission comprising two axially spaced pulleys, one having a positive driving connection with a source of power, and the other being operatively connected to the drive pulley through a suitable variable speed transmission comprising two variable diameter pulleys, one having a driving connection with the drive pulley and the other with the driven pulley, and means being provided for oscillating said variable diameter pulleys about a common axis, whereby the driving connections with said variable diameter pulleys will cause the diameters thereof to vary and thereby increase or decrease the speed of the driven pulley with respect to the drive pulley.

A further and more specific object of the invention resides in the provision of a drive pulley having means for connecting it to a suitable source of power, and a driven pulley having a variable speed mechanism operatively connecting it to the drive pulley, said mechanism comprising a casing mounted for rocking movement about a horizontal axis and supporting a pair of spaced parallel shafts mounted for rotation therein, one of said shafts having a variable diameter pulley secured thereto and a belt operatively connecting said variable diameter pulley to the drive pulley, and the other of said shafts having a similar variable diameter pulley secured thereto and having a belt connecting it to the driven pulley, said spaced-apart shafts being geared together for rotation in opposite directions whereby when the drive pulley is rotated in one direction, the driven pulley will be operated in the opposite direction, and means being provided for rocking the casing whereby the tension in said belts may be increased or decreased, thereby to vary the effective diameters of the variable diameter pulleys, whereby the speed of the driven pulley may be increased or decreased with respect to the speed of the drive pulley.

A further object is to provide a variable speed transmission of the character disclosed comprising two relatively short V-belts, one providing a driving connection between the drive pulley and a variable diameter pulley, and the other providing a driving connection between the driven pulley and a similar variable diameter pulley, and said variable diameter pulleys being mounted on a pair of spaced parallel shafts carried by a suitable casing mounted for rocking movement in a fixed support, and means being provided for axially moving the casing in its support, each time the casing is rotated to vary the effective diameters of the variable diameter pulleys, thereby to constantly maintain the belts in accurate alinement with their respective pulleys, and whereby each belt will always operate in a true plane, thereby reducing belt friction to a maximum, and also minimizing wear and tear on the belts.

A further object is to provide a variable speed transmission comprising a drive pulley and a driven pulley connected together by a suitable differential, and a variable speed power transmitting mechanism being associated with said pulleys and comprising a pair of spaced parallel shafts supported in a cylindrical casing adapted for limited rotary movement in its bearings, and also for axial movement therein, said shafts being geared together for rotation in opposite directions and each having a variable diameter pulley secured thereto having belt connections with said drive and driven pulleys, and means being provided for automatically axially moving the casing in its bearings each time the casing is manually rotated therein to vary the effective diameters of the variable diameter pulleys, thereby to maintain each belt in alinement with its respective pulleys.

Other objects of the invention reside in the unique manner in which the two shafts of the variable speed mechanism are operatively geared together for rotation in opposite directions; in the unique manner of supporting the shaft casing in its supports whereby it is adapted for both rocking and axial movements therein; in the pin and slot device provided in the periphery of the casing and in its bearings which operate to automatically axially move the casing in its supports, when the casing is rocked therein, thereby to cause each belt to always operate in a true plane, whereby wear and tear on the belts is greatly minimized; in the provision of a variable speed transmission in which any suitable speed desired may readily be obtained by simply rocking the gear casing in its supports; and in the simple and inexpensive construction of the transmission as a whole, whereby it readily lends itself for use in connection with a great many types of apparatus requiring a driven member be operated at various speeds, either forwardly or in reverse.

Other objects of the invention will appear from the following description and accompanying drawings and will be pointed out in the annexed claims.

In the accompanying drawings there has been disclosed a structure designed to carry out the various objects of the invention, but it is to be understood that the invention is not confined to the exact features shown, as various changes may be made within the scope of the claims which follow.

In the drawings:

Figure 1 is a side view of our improved transmission showing it attached to a motor;

Figure 2 is an end view of Figure 1;

Figure 3 is a sectional plan view substantially on the line 3—3 of Figure 1;

Figure 4 is a sectional elevation view substantially on the line 4—4 of Figure 2, showing the driving connections between the differential and the variable speed mechanism;

Figure 5 is a cross sectional view on the line 5—5 of Figure 4, showing the means for rocking or tilting the shaft casing;

Figure 6 is a detail sectional view substantially on the line 6—6 of Figure 4;

Figure 7 is a detail sectional plan view on the line 7—7 of Figure 6;

Figure 8 is a view showing another form of mechanism for longitudinally translating the shaft casing simultaneously as the casing is rocked to vary the speed of the driven member; and Figure 9 is a plan view of Figure 8, partially broken away.

In the selected embodiment of the invention herein disclosed, there is illustrated in Figure 4, for purposes of disclosure, a motor 2 having the usual bearings 3 and 4 for supporting shaft 5 thereof.

The novel transmission herein disclosed is shown including a differential housing, generally designated by the numeral 6, provided with spaced side frame members 7—7 which extend from the housing 6 toward the motor 2 and have their terminals secured to an annular member 8, shown fitted against the adjacent end of the motor and secured thereto by suitable means, such as screws 9. Spaced legs or feet 11 are shown provided on the annular portion 8 of the frame members 7, and a suitable foot or leg 12 is provided at the opposite end of the housing 6 and, in the present instance, cooperates with the feet 11 to suitably support the entire apparatus, including the motor, as will readily be understood by reference to Figures 1 and 2. The feet 11 and 12 may be provided with suitable apertures for receiving anchor bolts 13, shown in Figure 1.

The differential housing 6 is shown provided with end brackets 14 and 15 secured thereto by suitable bolts or screws 16, as shown in Figure 6. An anti-friction bearing 17 is mounted within the bearing bracket 15 and supports a sleeve-like hub 18 having a reduced bore for receiving the motor shaft 5, as best shown in Figure 4. The sleeve or hub 18 is keyed to the motor shaft for simultaneous rotation therewith. A suitable drive pulley 19 is keyed to the hub 18 for simultaneous rotation with the hub 18 and motor shaft 5.

A suitable differential, generally designated by the numeral 21, is mounted within the housing 6, and comprises a miter gear 22 secured to or integrally formed with the inner end of the sleeve-like hub 18. The gear 22 meshes with a plurality of gears 24 mounted on studs 23 secured to a central hub 20, keyed or otherwise secured to an enlarged portion 25 of a driven shaft 26. If desired, suitable anti-friction bearings 27, may be provided for supporting the gears 24 on the studs 23.

A miter gear 28, similar to the gear 22, is provided at one end of another sleeve-like hub 29, mounted in an anti-friction bearing 31 provided in the bearing bracket 14, as shown in Figure 4.

The driven shaft 26 has a reduced end portion 32 rotatively supported in the inner end of the hub 18 by suitable anti-friction bearings 33. The opposite end portion of the shaft 26 is supported in anti-friction bearings 34, inserted in the bore of the sleeve-like hub 29 of the miter gear 28. A driven pulley 35 is keyed or otherwise secured to the hub 29 and rotates as a unit with the motor gear 28. Suitable packings are provided, where necessary, to prevent oil leakage from the differential housing 6, as is well known in the art.

From the foregoing, it will thus be noted that the drive pulley 19 and driven pulley 35 are operatively connected together through the differential 21, and that the operation of the driven shaft 26 is depended entirely upon the operation of the differential 21, whose operation in turn is controlled by action of the novel variable speed mechanism herein disclosed, which is next to be described.

An important feature of the present invention resides in the novel mechanism provided for controlling the speed of the driven shaft 26 with respect to the motor shaft 5, it being understood that the motor shaft is usually operated at a constant speed. This mechanism, in combination with the differential 21, makes it possible to gradually increase the speed of the shaft 26 from zero to maximum, in any direction, by the manipulation of a single control lever.

The means provided for thus controlling the speed of the driven shaft 26 independently of the speed of the motor shaft 5, resides in the provision of a casing 36 having cylindrical end portions 37 received in suitable bearings provided in up-right brackets 38, shown integrally formed with the end brackets 14 and 15 of the differential housing 6. The casing 36 is preferably split vertically, as shown in Figures 3 and 4, and the two sections thereof are secured together by suitable bolts or cap screws 39, as shown in Figure 3.

Two shafts 41 and 42 are rotatively mounted in spaced parallel relation within the casing 36, and are preferably supported in suitable anti-friction or roller bearings 43, as clearly illustrated in Figure 3, although other types of bearings may be used, if desired. The shafts 41 and 42 are operatively connected together for rotation in opposite directions by a pair of spur gears 44, as shown in Figures 3 and 5. The shaft 41 has an extension 45 which projects from one end of the casing 36, as shown in Figure 9, and the other shaft 42 has a similar extension 46 which projects from the opposite end of the casing.

A variable diameter pulley, generally designated by the numeral 47, is mounted on the shaft extension 45 of the shaft 41, and a similar variable diameter pulley 48 is mounted on the extension 46 of the shaft 42. Each variable diameter pulley is shown comprising two complemental members, a fixed member 49 and an axially movable member 51. The fixed pulley members 49 may be secured to their respective shaft extensions in any suitable manner, well known in the art.

As above stated, the movable pulley section 51 of each variable diameter pulley is mounted for axial movement towards or away from its complementary fixed pulley member 49. To thus support the movable member 51 of each pulley, each such member is shown provided with a sleevelike hub 52 mounted for sliding movement upon the hub 53 of the fixed pulley member 49. A suitable spring 54 is shown coiled about the sleeve-like hub 52 of the movable pulley member and has its outer end seated against a cap 55 shown secured to the end of the hub 53 of the fixed pulley member 47, by such means as a nut 56. The spring 54 constantly urges the movable pulley member 51 towards its complementary fixed pulley member 49, as will readily be understood by reference to Figure 4. The inwardly directed faces of the pulley members 49 and 51 of each variable diameter pulley are cone shaped, as best shown in Figure 4, whereby they cooperate to provide what is commonly known to the trade as a V-type pulley.

While the movable pulley members 51 are freely movable in an axial direction on their respective hubs 53 against the tension of the springs 54, they are restrained from relative rotation on the hubs 53 by suitable pins 57 slidably received in sockets provided in the pulley members 51, and which pins have their outer ends suitably fixed to the cap 55, as will be understood by reference to Figure 4.

The drive pulley 19 secured to the sleeve-like hub 18 of the differential gear 22 has a V-belt 58 operatively connecting it with the variable diameter pulley 49 of the shaft 42. A similar V-belt 59 operatively connects the driven pulley 35 at the opposite end of the differential with the variable diameter pulley 47 secured to the shaft 41.

The shaft casing 36, as hereinbefore stated, is adapted for limited rotary or rocking movement about an axis $a$—$a$ which is located at the point of contact of the pitch lines of the intermeshing gears 44 of the shafts 41 and 42, as best shown in Figure 3, and also in the axes of the cylindrical end portions 37 of the casing 36, as will be noted by reference to Figures 3 and 9.

When the shafts 41 and 42 are disposed in a common horizontal plane $b$—$b$, as shown for example in Figures 5 and 6, the effective diameters of the pulleys 47 and 48 will be identical, whereby no power is transmitted to the driven shaft 26 because of the differential 21. This results because when the pulleys 47 and 48 are so adjusted, the miter gears 22 and 28 will merely rotate in opposite directions in their respective bearings 17 and 31 without imparting any rotation to the differential hub 20, the differential pinions 24 merely rotating upon their respective studs 23 without imparting any rotation to the hub 25 and therefore the shaft 26.

The operation of the driven shaft 26 is controlled entirely by rocking of the shaft casing 36, because when said casing is rocked from its normal horizontal position, shown in Figures 5 and 6, the effective diameter of one of the variable diameter pulleys will be increased and at the same time the effective diameter of the other of said pulleys will be decreased. Such variation in the diameters of the two pulleys will cause relative rotation between the differential gears 22 and 28, whereby rotation is imparted to the differential hub 20 which in turn drives the driven shaft 26.

To accurately control the operation of the driven shaft 26, means is provided for conveniently manually rocking or partially rotating the shaft casing 36 in its bearings. To thus partially rotate the casing 36, a hand wheel 61 is secured to one end of a threaded shaft or rod 62 mounted for rotation in a pair of cross bars 63 having their terminals 64 supported in suitable apertures or bearings provided in the upright frame members 38 of the end brackets 14 and 15 of the differential housing. A suitable nut 65 is received in threaded engagement with the rod or shaft 62, and is shown provided with oppositely extending terminals 66 received in open slots 67 provided in a pair of arms 68 depending from the gear casing 36, as clearly illustrated in Figures 4, 5, 6, 7 and 8.

From the foregoing it will readily be noted that when the hand wheel 61 is rotated in one direction, the shafts 41 and 42 will be rocking about the axis $a$—$a$ of the shaft casing 36, rotation of the hand wheel in one direction causing the differential to rotate the driven shaft 26 in a clock-wise direction, and when the hand wheel is rotated in the opposite direction, the driven shaft will rotate in a counter-clock-wise direction.

Another important feature of the present invention resides in the provision of means for maintaining the V-belts 58 and 59 in axial alinement with their respective pulleys, regardless of variations in the effective diameters of the pulleys 47 and 48. In other words, to obtain maximum wear of the belt, it is essential that belt friction be reduced to a minimum, and this we have achieved by mounting the casing 36 for axial movement in its bearings, whereby the belts 58 and 59 will always operate in true planes, that is the belt 58 will operate in the plane $c$—$c$, and the belt 59 in the plane $d$—$d$, shown in Figure 4. By thus operating the belts in true vertical planes, there is no lateral bending or twisting of the belts, whereby the belt friction is reduced to a minimum.

To vary the effective diameters of the pulleys 47 and 48, said pulleys are oscillated about the axis $a$—$a$ by rocking or tilting the casing 36. When the casing is rocked from its horizontal position to the position shown in Figures 1 and 2, the pulley 47 will swing below the horizontal, whereas the pulley 48 will swing above the horizontal. Such swinging movement of the two pulleys about the axis $a$—$a$ will cause the tension in the belt 58 to be increased, which will result in the belt separating the pulley members 49 and 51 of the pulley 48 as indicated in Figure 1, which results because of the movable pulley member 51 being moved away from the member 49 against the tension of the spring 54. Because of the unique mounting of the casing 36, a compensating action takes place in that the fixed pulley member 49 will be moved away from the plane $c$—$c$ of the belt 58 an amount equal to the outward movement of the movable pulley member 51 from the plane $c$—$c$. Thus by mounting the casing 36 for axial movement in its bearings, it will be noted that the belt 58 will always be maintained in the plane c—c, regardless of the effective diameter of the pulley 48.

The same applies to the pulley 47 which, when in its lowered position, as shown in Figures 1 and 2, will be alined with the belt 59 because of the casing 36 having been moved in a direction towards the belt 59, as will be understood. The casing 36 thus automatically adjusts itself axially to compensate for variations in the diameters of the pulleys 47 and 48, whereby the belts 58 and 59 will always operate in the planes c—c and d—d, respectively, as shown in Figure 4.

In Figures 4 and 7 there is shown a mechanism for axially moving or shifting the position of the casing 36 in its bearings. In the mechanism here shown, suitable cam faces 71 are provided on the depending arms 68 of the casing 36. The cam faces 71 are adapted to engage studs 72 adjustably mounted in the upper portions of the frame members 38. The cam faces 71, it will be noted by reference to Figure 7, are parallel with one another, whereby when the casing is rocked in one direction, one of the cam faces will cause the casing 36 to be axially moved in one direction, and when the casing is rocked in the opposite direction, the other cam face 71 will cause the casing to be axially moved in the opposite direction. The cam faces 71 are so designed as to accurately shift the gear casing in its bearings the exact amount necessary to always maintain the median planes of the variable diameter pulleys in true alinement with their respective pulleys 19 and 35.

In Figures 8 and 9 there is shown another mechanism for axially shifting the casing 36 in its bearings, wherein the upper portion of the supporting members 38 are slightly enlarged to provide seats or faces 73 adapted to receive a pair of split bearing caps 74. The caps 74 may be secured to the seats 73 by suitable cap screws 75. In the form shown in Figures 8 and 9, an inclined slot 76 is provided in the periphery of each cylindrical end portion 37 of the shaft casing 36, as best shown in Figure 9. A suitable stud 77 is secured to each bearing cap 74 and is received in the inclined slots 76. The angle of the slots 76 is such that when the shaft casing is rotated in its bearings, it will be axially translated therein simultaneously as it is rotated, thereby always maintaining the pulleys 47 and 48 in true alinement with their respective pulleys 19 and 35, with the result that the belts 58 and 59 will always operate in true planes, regardless of the tilted position of the shaft casing 36 in its bearings.

The mechanism shown in Figures 8 and 9 is very simple in construction, as it comprises few parts, all of which are so arranged as to provide a very attractive design, as will be noted by reference to Figure 8. Also by utilizing the structure shown in Figures 8 and 9, the shaft casing 36 is inseparably supported in the upper portions 38 of the end brackets 14 and 15 of the differential, although it may readily be detached therefrom by simply removing the caps 74. It is also to be understood that when this mechanism is employed, the cam faces 71 and studs 72 may be dispensed with. The casing 36 is, however, rotated by manipulation of the hand wheel 61, shown in Figure 5, as when using the cam faces 71 and studs 72.

As hereinbefore stated, the transmission herein disclosed has been found very practical and efficient in operation, primarily because of the unique mounting of the variable diameter pulleys 47 and 48 above the differential 21. It is well known that to obtain maximum belt efficiency, a belt should operate in a single plane so as to reduce to a minimum the flexing of the belt. In the novel arrangement herein disclosed, the belts 58 and 59 are always maintained in true alinement with their respective pulleys, and the springs 54 of the variable diameter pulleys, in addition to their function of maintaining their complementary pulley members in proper driving engagement with the belts, also serve to constantly maintain the belts at the proper tension to efficiently transmit power from the motor shaft 5 to the driven shaft 26.

In the operation of the novel transmission herein disclosed, when the shafts 41 and 42 are disposed in the horizontal plane b—b, shown in Figures 5 and 6, the driven shaft 26 will be at rest, as the differential gears 22 and 28 will then rotate in opposite directions at the same speed, whereby the gears 24 will idle upon their respective studs 23 without imparting relative rotation to the differential hub 20. To drive the driven shaft 26 in either direction, it is only necessary to manipulate the hand wheel 61, whereupon the shafts 41 and 42 are oscillated about the axis a—a, shown in Figures 1 and 2.

To afford a clearer explanation of the operation of the apparatus, the motor shaft 2 is here indicated as rotating in a clock-wise direction, when looking at the shaft end of the motor, whereupon the variable diameter pulley 48 will rotate in a similar direction, when viewed as shown in Figure 2, because of its driving connection with the motor shaft 5 through the belt 58. Because of the variable diameter pulley 47 being operatively connected to the variable diameter pulley 48 through the gears 44, the pulley 47 will always rotate in a counter-clock-wise direction, when looking at the end of the apparatus shown in Figure 2, or in the opposite direction from the motor shaft 5. The driven shaft 26 may, however, be driven in either direction with respect to the motor shaft 5 because of the differential 21.

If, for example, it is desired to drive the driven shaft 26 in a clock-wise direction, as indicated by the arrow in Figure 2, the hand wheel 61 will be rotated in a clock-wise direction whereupon the shaft 41 will be swung downwardly about the axis a—a, as indicated at M in Figure 2, and simultaneously the shaft 42 will be swung upwardly about said axis. Such swinging movements of the shafts 41 and 42 will tend to decrease the tension in the belt 59, whereupon the spring 54 will inwardly move the axially movable member 51 of the pulley 47 toward its complementary fixed member 49, with the result the effective diameter of the pulley 47 will be increased, as shown in Figures 1 and 2. Simultaneously, as the effective diameter of the pulley 47 is increased, the effective diameter of pulley 48 will be decreased, because of the increased tension in the belt 58 which will cause said belt to force the movable pulley member 51 outwardly or away from its complementary fixed member 49, against the tension of the spring 54, as will be clearly understood by reference to Figure 4.

When the effective diameters of the variable diameter pulleys 47 and 48 are thus varied, the differential gear 28 will rotate at a relatively slower speed than its complementary gear 22, which is constantly driven at motor speed. Such differential in the speeds between the gears 28 and 22 will cause the differential hub 20 to rotate in a clock-wise direction and thereby impart a similar motion to the driven shaft 26.

When it is desired to drive the shaft 26 in the opposite or in a counter-clock-wise direction, when viewed as shown in Figure 2, the shafts 41 and 42 are oscillated in the opposite direction as indicated at P in Figure 2. The speed of the driven shaft 26 is controlled by varying the angles M or P.

Thus the speed of the driven shaft 26, whether counter-clock-wise or clock-wise, may be gradually increased from zero to maximum and, vice versa, in a smooth unbroken curve and without shifting any gears or belts. Also because of the novel mounting of the casing 36 whereby it is mounted for axial movement in its supporting means, the belts 58 and 59 will always operate in the vertical planes c—c and d—d, respectively, whereby power loss through belt friction is reduced to a minimum, and the life of the belts is also greatly prolonged.

The transmission is very compact and, as shown in Figures 3 and 4, provides a complete variable speed power unit which may readily lend itself for use with various types of apparatus requiring a variable speed drive. In some instances, it may be desirable to dispense with the motor 2, in which case a pulley or other driving element, not shown in the drawings, may be secured to the hub 18 of the differential gear 22, whereby said hub may driven from some other source of power.

It will be apparent to those skilled in the art that we have accomplished at least the principal objects of our invention, and it will also be apparent to those skilled in the art that the embodiments herein described may be variously changed and modified, without departing from the spirit of the invention, and that the invention is capable of uses and has advantages not herein specifically described; hence it will be appreciated that the herein disclosed embodiments are illustrative only, and that our invention is not limited thereto.

We claim as our invention:

1. In a transmission of the class described, a supporting frame, a differential gearing mounted in said frame and comprising oppositely disposed rotatable members, one of which is adapted to be drivingly connected to a source of power, a power output shaft operatively connected to the differential gearing, a fixed diameter V-pulley secured to each of said members, a housing mounted for rocking movement in said frame about an axis disposed in spaced parallel relation to the axis of the differential, a pair of spaced parallel shafts rotatably supported in the housing, one of said shafts extending outwardly from one end of the housing and the other of said shafts extending from the opposite end of the housing, a variable diameter pulley secured to each shaft extension, a V-belt drivingly connecting each variable diameter pulley to one of said fixed diameter pulleys, gears in said housing connecting together said shafts for rotation in opposite directions and whereby the fixed diameter pulleys rotate in opposite directions, rotary means for rocking the housing to vary the effective diameters of the variable diameter pulleys, thereby to control the speed of the power output shaft, and cam means for simultaneously axially translating said housing, when rocked, thereby to automatically maintain the median plane of said variable diameter pulleys in alignment with the median planes of their respective fixed diameter pulleys.

2. In a transmission of the class described, a supporting frame, a differential gearing mounted in said frame and comprising axially aligned rotatable members, one of which is adapted to be connected to a suitable source of power, a power output shaft operatively connected to the differential gearing, a fixed diameter V-pulley secured to each of said members, a housing mounted for rocking movement in said frame about an axis disposed in spaced parallel relation to the axis of the differential, a pair of spaced parallel shafts rotatably supported in the housing, one of said shafts extending outwardly from one end of the housing and the other of said shafts extending from the opposite end of the housing, a variable diameter pulley secured to each shaft extension, V-belts drivingly connecting said variable diameter pulleys respectively to said fixed diameter pulleys, gears in said housing connecting together said shafts for rotation in opposite directions and whereby the fixed diameter pulleys rotate in opposite directions, rotary means for rocking the housing to vary the effective diameters of the variable diameter pulleys, thereby to control the speed of the power output shaft, and cam faces on said housing engageable with fixed means on the supporting frame to axially translate said housing, when rocked, thereby to automatically maintain the median planes of said variable diameter pulleys in alignment with the median planes of their respective fixed diameter pulleys.

3. In a transmission of the class described, a supporting frame, a differential gearing mounted in said frame and comprising axially aligned rotatable members, one of said members having an axial bore therein and the other of said members having means whereby it may be connected to a suitable source of power, a power output shaft mounted for relative rotation in said bore and operatively connected to the differential gearing, a fixed diameter V-pulley secured to each of said members, spaced bearings in the upper portion of the frame, a housing having cylindrical end portions mounted for rocking movement in said bearings, a pair of spaced parallel shafts rotatably mounted in the housing, one of said shafts extending outwardly from one end of the housing and the other of said shafts extending from the opposite end of the housing, a variable diameter pulley secured to each shaft extension, a V-belt drivingly connecting said variable diameter pulleys respectively to said fixed diameter pulleys, intermeshing gears secured to said shafts within the housing for causing said shafts to rotate in opposite directions and also whereby the fixed diameter pulleys are rotated in opposite directions when the transmission is in operation, means for rocking the housing in its bearing to vary the effective diameters of the variable diameter pulleys, thereby to control the speed and direction of rotation of the power output shaft, and interengaging means on the housing and supporting frame for axially translating said housing, when rocked in its bearings, thereby to automatically maintain the median planes of said variable diameter pulleys in alignment with the median planes of their respective fixed diameter pulleys.

EDWIN G. STAUDE.
AXEL M. WALSTROM.